Oct. 6, 1970 — T. F. BICKLEY — 3,531,973
THREADED, FLUID-ACTUATED APPARATUS
Filed Sept. 26, 1968 — 2 Sheets-Sheet 1
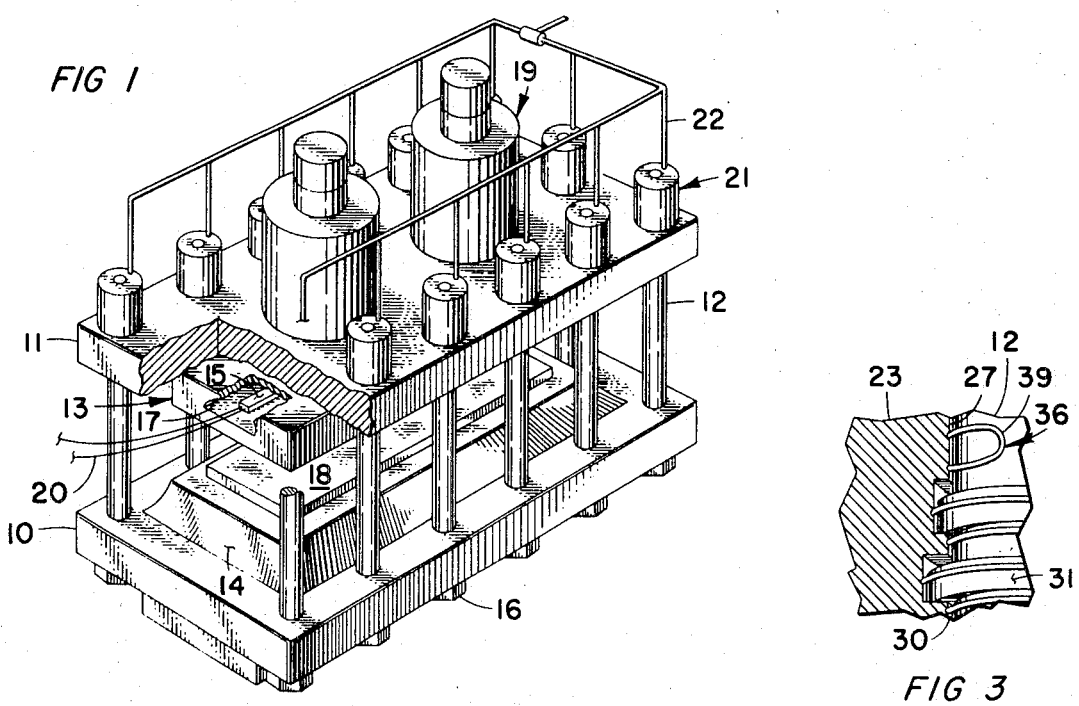
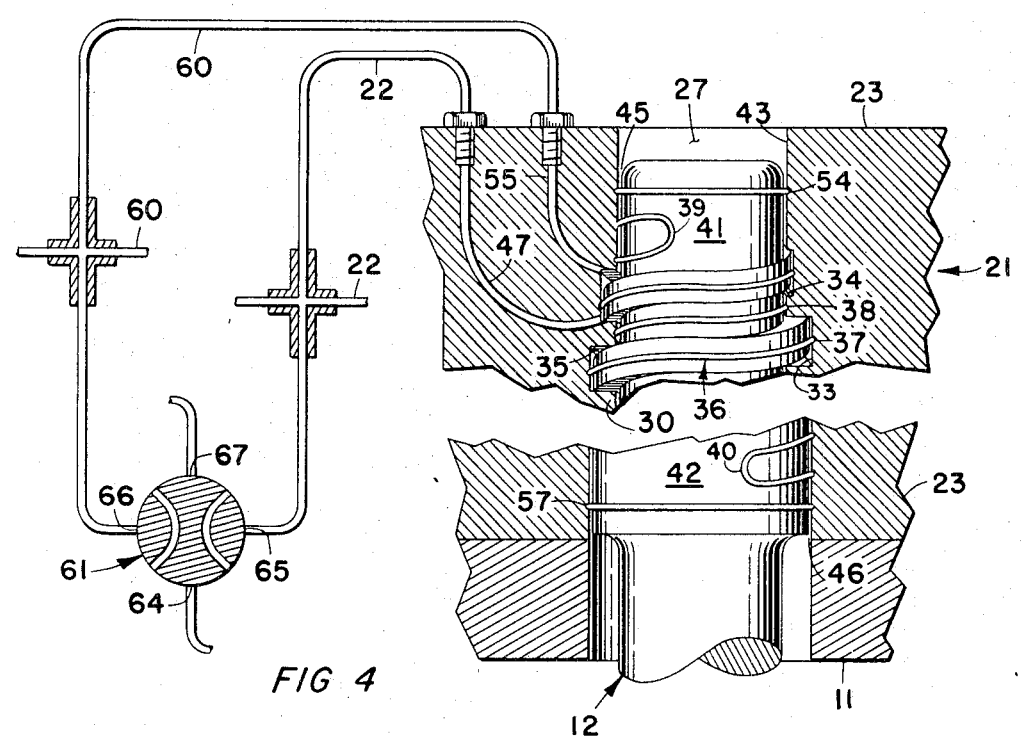
THOMAS F. BICKLEY
INVENTOR

THOMAS F. BICKLEY
INVENTOR

United States Patent Office 3,531,973
Patented Oct. 6, 1970

3,531,973
THREADED, FLUID-ACTUATED APPARATUS
Thomas F. Bickley, Grand Prairie, Tex., assignor to LTV Aerospace Corporation, Dallas, Tex., a corporation of Delaware
Filed Sept. 26, 1968, Ser. No. 762,847
Int. Cl. B21j 13/04
U.S. Cl. 72—455                                                  13 Claims

ABSTRACT OF THE DISCLOSURE

This invention provides a threaded, fluid-driven actuator comprising a chamber threadingly engaged with a member, the member being axially moveable with respect to the chamber. An embodiment of the invention provides an apparatus for connecting multiple, elongated members between two mutually spaced platens in a press whereby tensional forces to which the elongated members are subjected are substantially evenly distributed between the members. The tensional forces are transmitted through a liquid to a helical, load-bearing surface formed on each elongated member.

---

This invention relates to fluid-actuated apparatus and, more particularly, to an actuator having a chamber which is threadingly engaged with an axially slideably member. The invention is particularly adapted for use with presses of the type provided with mutually spaced platens, the apparatus serving as an improved means for connecting the platens.

Fluid-driven actuators of the type having a piston slideably mounted in a chamber and moveable by a fluid pressure differential within the chamber and across the piston have several disadvantages when used in applications requiring a compact actuator capable of producing great axial forces. For a given maximum, safe fluid pressure within the chamber of such an actuator, the axial force produced is dependent upon the piston-face area of the piston (the force is equal to the pressure multiplied by the area); thus, in order to achieve an axial force sufficient, for example, to actuate a metal-forming press, the piston-face area is required to be of a relatively large size such that the piston and chamber are undesirably large and cumbersome.

To illustrate a second, but related problem, in presses of the type provided with first and second, mutually spaced platens and a plurality of elongated connecting or tension members extending between the platens, compressional forces exerted upon a workpiece disposed between the platens produce correspondingly, oppositely directioned forces which tend to move the platens apart. These forces tending to separate the platens are imposed as tensional forces upon the tension members, and the tension members must be sufficient strength to withstand the tensional forces and thus prevent undesired relative displacement of the platens. An important desirability sought in the construction of such presses is the construction of the tension members and their attachment to the two platens such that each member receives a substantially equal amount of the tensional loads imposed upon them by the separating force. It has been impossible to make and adjust all the tension members to precisely the same effective length; thus, the shortest member bears the brunt of the tensional loads. Should the short member fail under the force, a correspondingly greater load is placed on the other members, thus resulting in a possible series of failures.

These difficulties caused by the unequal distribution of tensional loads between multiple tension members of a press are apparent, for example, in modern, metal-forming presses. Such metal-forming presses have been developed which employ high-energy sources, such as explosive charges and capacitor discharge apparatus, whereby forming forces are developed which were heretofore unobtainable. As would be expected, such forces impose a high degree of stress upon the press; deformation or even destruction of portions of the press may result, and workmen, equipment, etc. nearby the press are thus endangered. Typically, such presses are of the above-described type provided with first and second, mutually spaced platens and a plurality of elongated connecting or tension members extending between the platens. Such presses are normally provided with at least one die affixed to one of the platens and either a second die or other construction confronting the first die and affixed to the other platen. Such other construction, for example, may comprise an apparatus provided with a liquid-filled chamber in which an explosive charge is suspended, the explosive being electrically ignitable by means of an electrical cable which extends from the explosive to a source of electrical potential.

In such explosively actuated presses, a great tensional force is momentarily exerted upon the multiple tension members upon ignition of the explosive charge, and, as described above, if the shortest tension member fails under the load, a series of failures may result. The use of fewer and larger tension members is inefficient from a metallurgical standpoint and results in increased difficulties of tooling and mounting. Thus, as is known in the metal-forming art, it is extremely difficult to form large bodies of metal such that the metal is tempered consistently throughout the piece; yet the tension members in many explosively actuated presses of the type described are of diameters, for example, of between six and eight inches, hence cannot practicably be made of uniform temper. It is also essential that all the tension members of a press be formed such that they are of the same coefficient of thermal expansion so that each tension member expands or contracts to the same degree as changes occur in the temperature of the press; for, if they are not, even slight changes in the temperature of the press cause particular ones of the tension members to vary in length relative to the other members and thus result in an uneven load-distribution.

A further, though related problem arises when particular ones of the tension members are caused to expand or contract because of temperature variations which affect those particular tension members only. For example, the mere presence of a window adjacent a press whereby sunlight heats only particular ones of the tension members has been known to cause sufficient variation in the relative lengths of the tension members to produce breakage of the non-heated members and resulting failure of the press.

A major problem arises with respect to the fastening of the respective tension members to the two platens. Typically, massive nuts are threaded to the respective ends of each tension member such that the nuts seat upon copper or brass shims inserted between each nut and a respective platen at surfaces of the platens which surfaces are opposite the explosive forming means. Each of the nuts must be tightened with substantially the same degree of torque to ensure equal loading, but such precise control of torque is difficult because of the distortion of torque measurements by frictional forces upon the nut as it bears against the shim and engaging, male threads. After successive detonations of the explosive charge, the shims are deformed by the explosive forces, and additional shims must be inserted and further adjustments made to the nuts. Thus, the attachment and adjustment of the tension members requires painstaking and time-consuming adjustments by skilled workmen, which adjustments are only partially effective in equalizing the loads upon the tension members.

Largely because of these difficulties related to the equal distribution of load to multiple tension members, the use of high-energy forming means has been limited to applications in undesirably small presses. In larger presses, the greater number of tension members required manifolds the difficulty of properly installing and adjusting the tension members. As discussed above, the use of fewer but larger tension members is impracticable from a metallurgical and tooling standpoint. In particular, the use of such high-energy presses in the coining of metal parts promises major advancements in the metal-forming art, for the necessity of expensive and time-consuming machining procedures is thereby eliminated. Again, however, present usage is limited to applications in undesirably small presses.

It is, accordingly, a major object of the present invention to provide a new and improved, fluid-driven actuator.

Another object is to provide a compact, fluid-driven actuator having a piston-face area greater than the cross-sectional area of the actuator chamber, yet having only one moving part.

Another major object of the present invention is to provide a new and improved construction and apparatus for providing equal loading of each tension member in a press.

Another object is to provide means for connecting multiple tension members to a platen of a press, the connecting means being adapted to eliminate the necessity of readjustment of the tension-member fastening means after repeated operations of the press.

A further object is to provide such connecting means which will compensate for unequal expansions and/or contractions among tension members in a press.

Yet another object is to provide a tension-member connecting means by which tensional loads are conveniently and equally distributed to a large number of tension members, whereby larger high-energy presses may be built than are presently feasible.

A still further object is to provide such a connecting means wherein forces produced during operation of the press are transmitted to individual tension members at relatively large, loading-bearing surface on each member rather than being concentrated at a relatively small area.

Another object is to provide such a connecting means in which equal loading of the tension members is automatically maintained despite repeated forming operations.

Another object is to provide an apparatus having the above-stated advantages which does not require the use of platens or tension members having the close tolerances which are now required in such members.

Still another object is to provide an apparatus having the above-stated advantages yet which is of simple construction and has few moving parts.

Other objects and advantages will be apparent from the specification and claims and from the accompanying drawing illustrative of the invention.

In the drawing:

FIG. 1 is a perspective, somewhat schematic view, partially cut away, of an explosively actuated forming press which has been modified according to the present invention;

FIG. 3 is a side view, partially in section, of a portion of the apparatus shown in FIG. 2; and FIG. 4 is a somewhat schematic, side view, partially in section, of a portion of a modified embodiment of the apparatus shown in FIG. 2 together with a similar view of a valve.

Figure 2:
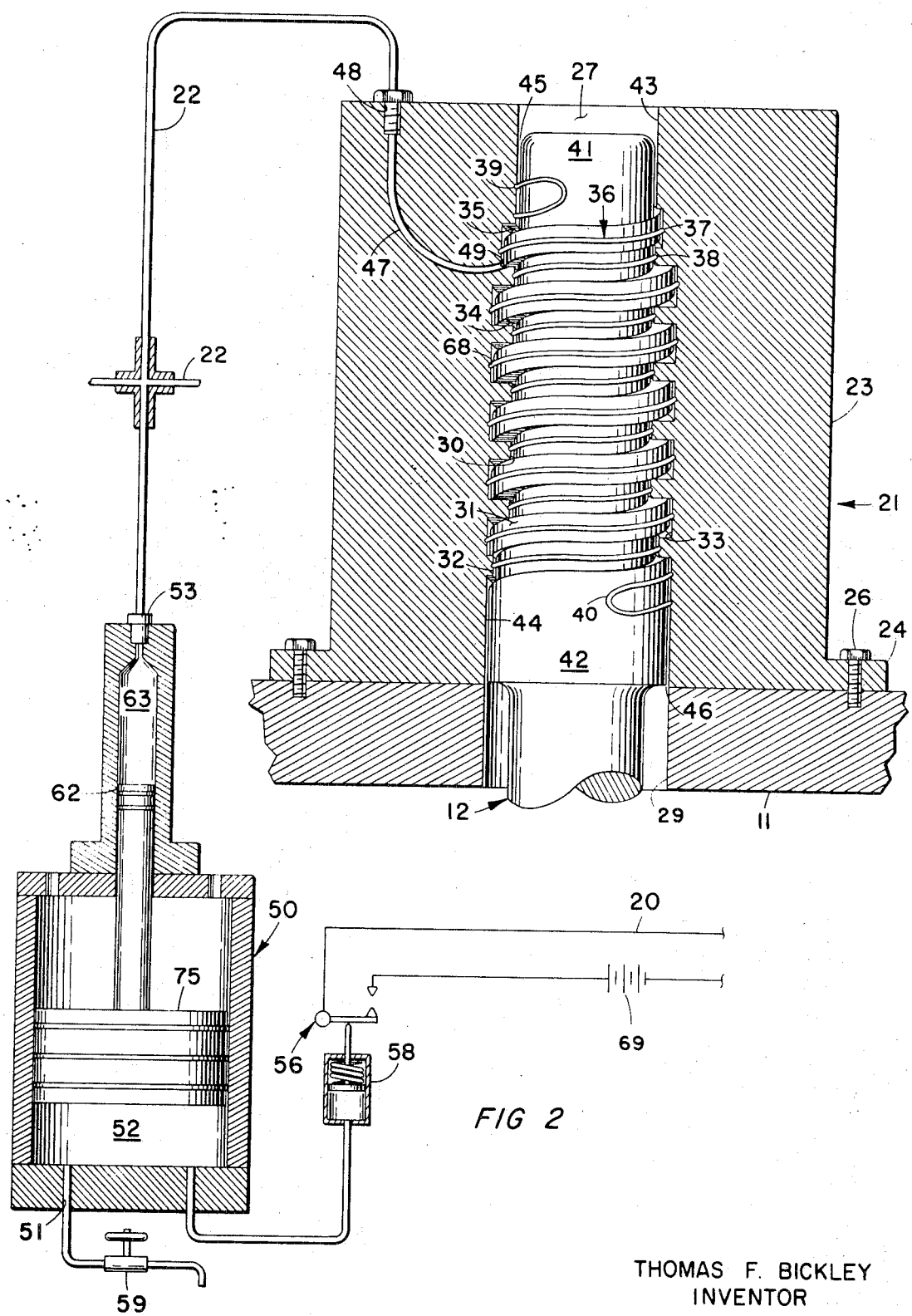
FIG. 2 is a side view, partially in section, of one of the connecting means and related structure, together with similar views of a hydraulic intensifier and a pressure-responsive, electrical switch.

With reference to FIG. 1, a typical high-energy press comprises a first or lower platen 10 and a second or upper platen 11. A plurality of elongated connecting or tension members 12 extends between the upper and lower platens 11, 10. These tension members 12 are preferably rigidly connected to the lower platen 10 by conventional means comprising nuts 16 threadably engaged with the tension members 12. A construction 13 is mounted between the platens 10, 11 and confronts a forming die 14 affixed to the lower platen 10. The construction 13 includes an explosive chamber 15 which is secured in a liquid environment within an explosive chamber 17 formed within the construction 13. A workpiece 18 to be formed is placed between the die 14 and the construction 13. Adjustable supports 19 are mounted on the upper platen 11 and connected to the construction 13 for raising or lowering the construction as desired. Ignition wires 20 extend from the explosive charge 15 to a source of electrical potential (not shown).

High-explosive forming presses, as thus far broadly described, are known in the art. In operation, the construction 13 is lowered onto the workpiece 18 by the adjustable supports 19 so that an initial, downward force is exerted on the workpiece and a corresponding, upward force is exerted upon the upper platen 11. Upon ignition of the explosive charge 15, pressure is distributed evenly through the liquid-filled, explosive chamber 17 to the workpiece 18. The explosive 15 exerts a great shock-force in an upward direction upon the upper platen 11 through the adjustable supports 19 and, in a downward direction, through the workpiece 18 and die 14 to the lower platen 10; these forces thus tend to move the upper and lower platens apart. The tension members 12 act to restrain the upper and lower platens 11, 12 from undesired, relative displacement as they are subjected to the forces produced by the explosive charge 15; and the tension members are thereby subjected to great tensional forces. The use of tension members for this purpose is, of course, known in the art. As described above, a chief problem in the construction of such presses is the connection of the multiple tension members 12 between the upper and lower platens 11, 10 such that each member absorbs an equal amount of the explosive-forming force.

The present apparatus employs conventional means such as the nuts 16 to affix the tension members 12 to the lower platen 10, but fluid-actuated and force-distributing apparatus including a plurality of mutually spaced connecting means 21 is employed to connect the tension members 12, at their respective upper ends, to the upper platen 11. Each connecting means 21 is connected to one of a plurality of first supply passageways or conduits 22.

Referring now to FIG. 2, one of the connecting means 21 comprises a cylindrical housing 23 mounted on and above the upper platen 11 and having an external flange 24 which extends outwardly from the lower end of the housing. The housing 23 is rigidly affixed to the upper platen 11 by a plurality of bolts 26 which extend through respective bores which themselves extend vertically through and are mutually spaced along, the flange; the bolts threadingly engage corresponding bores formed with the upper platen 11. Formed coaxially with and through the housing 23 is a generally cylindrical chamber 27, which is thus immovably located with respect to the upper platen 11 because of the rigid affixment of the housing 23 to the platen 11. The housing 23 is mounted such that its chamber 27 is in register with an opening 29 formed through the upper platen 11 and through which the upper end of one of the tension members 12 extends. The chamber 27 is provided with a female thread forming a helical rib 30 which is of substantially rectangular cross-section, and the member 12 is provided with a corresponding male thread threadingly engaging the female thread and forming a helical rib 31 also preferably of rectangular cross-section. Other flat-crested threads, such as the "Acme" thread, may also be used. For reasons which will become apparent, the member 12 preferably has first and second unthreaded portions 41, 42 of cylindrical cross-section and located immediately above and below, respectively, the member rib 31 and loosely engaged, respectively, by corresponding first and second, unthreaded portions 43, 44 of the chamber 27. This loose engagement of the member first and second unthreaded portions 41, 42 by the first and second unthreaded portions 43, 44 of the chamber 27 produces upper and lower, annular, peripheral cavities 45, 46, the upper peripheral cavity being disposed peripherally of the member first unthreaded portion 41 and between that portion 41 and the first unthreaded portion 43 of the chamber 27, and the lower peripheral cavity 46 being disposed peripherally of the member second unthreaded portion 42 and between that portion 42 and the second unthreaded portion 44 of the chamber. The diameters of the first and second unthreaded portions 41, 42 of the member 12 are substantially equal, respectively, to the minor and major diameters of the member rib 31.

The member and chamber thread ribs 31, 30 from associated member and chamber helical thread grooves 32, 33, respectively, and each of the grooves is provided with a flat bottom wider than the respective thread rib engaged by the groove, such that first and second helical cavities 34, 35 are formed within the chamber groove 33 and on opposite sides, respectively, of the associated member rib 31. The first helical cavity 34 is disposed such that each turn thereof lies immediately below the adjacent, corresponding portion (turn) of the member rib 31 or between that rib turn and the lower platen 10 (FIG. 1); conversely, the second helical cavity 35 is disposed such that each turn thereof lies immediately above the adjacent, corresponding portion (turn) of the member rib or with that member rib portion disposed between that turn of the second helical cavity and the lower platen. The member and chamber ribs 31, 30 are each slideably seated against the bottom of the respective, associated groove 32, 33 for permitting limited movement of the chamber 27 along the longitudinal axis of the associated member 12; relative rotational movement of the chamber and member is prevented by the rigid affixment of the member to the lower platen 10 (FIG. 1). The member 12 and housing 23 are initially assembled, however, by threadingly engaging the member 12 and housing 23 and rotating the housing 23 about the axis of its chamber 27 and in a clockwise angular direction when looking down upon the chamber (assuming, for example, the use of right-hand threads forming the member and chamber ribs 31, 30) until the unthreaded portions 41, 42 of the member 12 are in register with the corresponding, unthreaded portions 43, 44, respectively, of the chamber 27. The member rib 31 is of gradually decreasing height in a helically upward direction at an upper portion thereof (for example, at its uppermost turn) such that its crest merges into the surface of the cylindrical, first unthreaded portion 41 of the member 12. Correspondingly, the chamber groove 33 has an upper portion confronting the above-described portion of the member rib 31 and also being of gradually decreasing depth such that it mates with the above-described portion of the member rib and such that its bottom merges into the first unthreaded portion 43 at the upper peripheral cavity 45. Correspondingly, the first and second helical cavities 34, 35, because they extend along the chamber groove 33, merge into and are in communication with the upper peripheral cavity 45. Similarly, a corresponding rib portion of gradually decreasing height in a downward direction is formed at the lowermost turn of the chamber rib 30 and member groove 32 such that the first and second helical cavities 34, 35 also merge into and are in communication with the lower perpheral cavity 46.

A seal 36 is provided in the form of and endless band of a material such as neoprene and with first and second side portions 37, 38 which extend between and are continuous with first and second end portions 39, 40; the seal is mounted adjacent the first helical cavity 34 and with its first side portion 37 extending helically along the member rib 31 and sealingly seated between the member rib crest and the bottom of the associated chamber groove 33 and with the seal second side portion 38 extending along the chamber rib 30 and sealingly seated between the chamber rib crest and the bottom of the associated member groove 32. The seal first end portion 39 is sealingly seated between the member 12 and the housing 23 at the upper eripheral cavity 45. Similarly, the seal second end portion 40 is sealingly seated, at the lower peripheral cavity 46, between the member 12 and housing 23. The seal 36 is preferably of substantially circular cross-section, and is necessarily of greater thickness, in a horizontal direction, than any space between the member 12 and housing 23 in order that it may sealingly seat against both the member 12 and housing 23. With the seal 36 in place, the first helical cavity 34 merges into the first and second peripheral cavities 45, 46 only at portions thereof lying within the endless band formed by the seal 36. The seal 36, in cooperation with the member 12 and housing 23, thus effectively isolates the first helical cavity 34 from the second cavity 35 and from the environmental ambient to the member 12 and housing 23. The second helical cavity 35, however, it still open to the atmosphere or the environment ambient to the member 12 and housing 23, for it is in communication, through the portions of the upper and lower peripheral cavities 45, 46 not thus isolated by the seal 37, with the ambient environment.

The seal 36 is preferably seated immovably with respect to the housing 23 (for example, in a corresponding groove 68 formed in the housing) and the seal first side portion 37 is seated equidistantly, at each turn of the chamber groove 33, from the associated turns of the chamber rib 30 above and below that chamber groove turn. The member 12 is thus slideable axially relative to both the housing 23 and the seal 36. The crest of the member rib 31 is necessarily of sufficient width relative to the width of the bottom of the chamber groove 33 such that, at all positions of the member 12 relative to the housing 23, the member rib crest is still seated against the seal 36; thus, the member rib crest must be at least half the width of the bottom of the corresponding chamber groove 33. The seal end portions 39, 40 and any portions of the side portions 37, 38 which lie within the upper and lower peripheral cavities 45, 46 must be similarly seated and spaced such that the unthreaded portions 41, 42 of the member seat against the seal 36 at all relative positions of the member 12; correspondingly, the unthreaded portions 41, 42 of the member 12 and unthreaded portions 43, 44 of the chamber 27 must be of sufficient length to allow such placement. Thus, the portions of the seal 36 extending within the upper peripheral cavity 45 must be seated below the uppermost portion of the first unthreaded portion 41 of the member 12 when the member is in its lowermost relative position. Similarly, the portions of the seal 36 which extend within the lower peripheral cavity 46 must be positioned such that the second unthreaded portion 42 of the member 12 seats against those portions at all relative positions of the member 12; i.e., the lowermost portion of the seal 36 must seat above the lowermost portion of the second unthreaded portion 42 of the member 12 when the member is in its uppermost position.

Means for supplying a liquid under pressure to the first helical cavity 34 comprises a passageway 47 formed through the housing 23 and having an inlet 48 and an outlet 49 communicating with the first helical cavity 34. The means for supplying a liquid under pressure to the first helical cavity 34 further comprises a supply passageway or conduit 22 communicating with the inlet 48 and also with an outlet 53 of a source of liquid under pressure, which outlet 53 is common to all of the connecting means 21 of the press by its additional communication with all of the other conduits 22 (FIG. 1). For convenience, the inlet 48 is formed at the upper end of the housing 23. The conduits 22 are somewhat flexible to allow for the axial movements of the housings 23.

In the preferred embodiment, the source of liquid under pressure comprises a pressure intensifier 50 wherein liquid (for example, a hydraulic fluid) introduced through an inlet 51 into a large piston chamber 52 moves a large piston 75 and causes a smaller amount of liquid in a smaller chamber 63 to be ejected from outlet 53 at a pressure greater than that of the large piston chamber, the pressure difference being proportional to the relative difference in cross-sectional areas between the smaller and larger chambers because of principles well-known in the art. A control valve 59 is in communication with the inlet 51 of the pressure intensifier 50 and with a primary source (not shown) of liquid under pressure. A piston 62 is sealingly seated within the small piston chamber 63 and is termed hereinafter, the "small piston" 62.

For a reason to be discussed in a later paragraph, the total, effective piston-face area of the chamber rib 30 in each chamber 27 is preferably equal to the corresponding piston-face area at each other chamber 27 of the press. The effective piston-face area of the chamber rib 30 at each chamber 27 is equal to the product of the length of the rib multiplied by its average depth. The effective piston-face area of the chamber rib 30 at each chamber 27 is also substantially equal to the piston-face area of the associated member rib 31. The total effective piston-face area of all the chamber ribs 30 is also substantially greater than the piston-face area of the small piston 62.

A normally open switch 56 is electrically connected to one of a pair of ignition wires 20 and in series between a source of electrical potential 57 and the explosive charge 15 (FIG. 1). The switch 56 includes an actuator 58 of the pressure-responsive type which acts to close an associated, electrical switch upon a predetermined fluid pressure being exerted within it. The actuator 58 is in liquid communication with the large piston chamber 52 of the pressure intensifier 50. Thus, the actuator 58 is calibrated to close the switch 56 upon the occurrence of a desired pressure within, for example, the large piston chamber 52.

In operation, the control valve 59 is opened to allow hydraulic liquid under pressure to flow through the inlet 51 to the large piston chamber 52 of the pressure intensifier 50. The increased pressure within the large piston chamber 52 causes liquid to flow out of outlet 53 and through the supply conduits 22 at a higher pressure than that of the chamber 52, as described above.

With reference now to FIG. 1, the liquid under pressure is caused to flow through the plurality of supply conduits 22 to each of the respective connecting means 21. Because the supply conduits 22 are each in communication with a common source of liquid under pressure by their common connection to the pressure intensifier outlet 53 (FIG. 2), the liquid is supplied under substantially the same pressure at each of the connecting means 21.

Referring now to FIG. 3, the cylindrical housing 23, chamber 27, and chamber rib 30 are shown in a first position, relative to the tension member 12 and member rib 31, in which the respective turns of the chamber rib 30 rest against the associated turns of the member rib immediately above them. Such a relative position occurs upon the application of an initial downward force to the workpiece 18 (FIG. 1), as described above with reference to the operation of forming presses in general; for the corresponding, upward force upon the upper platen 11 (FIG. 1) is transmitted to the housing 23 and causes the housing, chamber 27, and chamber rib 30 to be displaced upwardly until the respective turns of the chamber rib 30 rest against the associated turns of the member rib 31 immediately above them.

With reference again to FIG. 2, upon liquid under pressure flowing through the passageway inlet 48, it is conducted through the passageway 47 to the first helical cavity 34 where it exerts, upon the respective turns of the member rib 31 and adjacent, associated turns of the chamber rib 30, a force tending to move them apart and to displace the chamber rib, housing 23, and upper platen 11 in a downward direction to a second position, as shown in FIG. 2, in which the respective turns of the member rib 31 are approximately centered within the associated turns of the chamber groove 33. The high fluid pressure within the first helical cavity 34 exerts a great downward force upon the chamber rib 30 because of the large effective piston-face area formed by the chamber rib, which downward force is transmitted through the chamber rib to the housing 23 and the upper platen 11. From the upper platen 11, the force thus produced by all of the connecting means 21 (FIG. 1) is transmitted through the adjustable supports 19 (FIG. 1) to the construction 13 and workpiece 18 (FIG. 1). As more fluid is introduced into the first helical cavity 34 of FIG. 2, the chamber rib 30 is further displaced downwardly until it reaches a third position (not shown) in which the respective turns of the chamber rib rest against the corresponding turns of the member rib 31 immediately below them. The connecting means 21 thus act as fluid-driven actuators which urge the respective members 12 in an upward direction relative to the associated housings 23.

After the liquid has been conducted through the supply conduit 22 and passageway 47 and into the first helical cavity 34 until the chamber rib 30 is in the third or downward position (not shown), the liquid is normally maintained in the conduit, passageway, and first helical cavity under a constant pressure during operation of the press. Because the liquid is conducted to the first helical cavity 34 of each connecting means 21 of the press from a common source, the pressures within all the respective first helical cavities are substantially equal upon the first helical cavities being filled with liquid. The seals 36 at the respective connecting means 21 prevent any substantial leakage of the liquid from the respective first helical cavities 34 to the second helical cavities 35 or to the perpheral cavities 45, 46; thus, once the first helical cavities are filled with liquid and the chamber ribs 30 are urged to their third position, substantially no fluid flow occurs within the supply conduits 22 or passageways 47.

Upon detonation of the explosive charge 15 (FIG. 1) during operation of the press, the resulting upward force exerted upon the upper platen 11 is transmitted through each cylindrical housing 23 to the associated chamber rib 30. At each housing 23, the upward force is then transmitted, by the respective chamber rib 30, through the liquid to the member rib 31 and tension member 12. The liquid medium is under an initial pressure which is equal at each of the connecting means 21 (because of the common supply source), and it distributes the explosive-produced force such that each tension member 12 sustains a substantially equal share of the load. That is, because the force is transmitted through the liquid medium, slight differences in lengths of the members 12 not sufficient to bring any of the respective turns of the member ribs 31 in contact with the associated turns of the chamber ribs 30 immediately below them do not affect the distribution of the load between the members 12. This is an important advantage over the prior art, for the need for making and adjusting the tension members to precisely the same length is eliminated and the expense of machining the members to close tolerances is thus avoided. Because each of the connecting means 21 is provided with a member rib 31 having a total effective piston-face area substantially equal to that of the associated chamber rib 30 and to that of the member rib at each other connecting means, an additional, momentary pressure in the liquid caused by the explosive force is substantially equal at each connecting means 21 and causes a substantially equal additional force to be transmitted to each member 12. In contrast, if the respective effective piston-face areas formed by the member ribs 31 of the connecting means 21 are, instead, of differing values, the pressure within the first helical cavity 34 of each connecting means 21 upon detonation initially differs but quickly equalizes through the common supply conduits 22; the respective members 12 are then undesirably subjected to differing tensional forces depending upon the piston-face areas of the respective member ribs 31. However, slight differences between these piston-face areas such as those which occur in the machining of parts do not intolerably affect the distribution of load to the members 12, and machining of the member ribs 31 and chamber ribs 30 to close tolerances is not required.

The pressure-responsive actuator 58 of the switch 56 is adjusted to maintain the switch in an open position until the pressure within the large chamber 52 of the pressure intensifier 50 reaches a level at which the corresponding and proportionately higher pressure at the outlet 53, passageway 47, and first helical cavities 34 are sufficient to cause the housings 23 and upper platen 11 to move downwardly to the third position. The switch 56 is used to cause automatic detonation of the charge 15 upon a safe pressure level being reached by merely raising the pressure within the pressure intensifier 50 until the switch closes and allowing closing of the switch to cause detonation of the charge 15. The switch 56 thus acts as an apparatus responsive to the liquid pressure within the first helical cavities 34 to prevent detonation of the charge 15 (FIG. 1) before the initial pressure of the liquid is at a safe level.

The construction descrbed thus provides a highly efficient apparatus for equally distributing, among a plurality of tension members of a press, shock forces produced during high-energy forming. Because the load is transmitted to the tension members 12 through a liquid medium, each tension member bears a substantially equal share of the load. The use of multiple rib turns spaced along the longitudinal axes of the tension members 12 allows efficient loading of the members, for the shock force is transmitted to the members over a relatively large area thereof. Thus, the forces are not concentrated at relatively small portions whereby the material of the connecting means used is distorted or deformed, as is the case where conventional nut and shim fastening means are used, as previously descrbed. Because the fastening means are not thus deformed, the necessity of readjustment of the tension member fastening means after successive forming operations is not necessary in the present apparatus, and forming operations may continue without the waste of labor and time required for such adjustments. The tension members need not be made wastefully large as a safety precaution against breakage resulting from unequal distribution of load. Expansion or contraction of particular ones of the tension members 12 because of variations in their temperatures does not affect the loading of the members, for the shock forces are distributed through the liquid regardless of such minor variations. Because of this elimination of the adjustment problems of conventional fastening means, presses in which a very large number of tension members 12 are required are now practicable. Moreover, the use of threadingly engaged tension members 12 and housings 23 allows convenient assembly of parts and provides a simple construction of few moving parts for the connecting means 21.

It should be noted that, because of the large total piston-face area of the chamber ribs 30 of all of the chambers 27 relative to the much smaller cross-sectional area of the small chamber 63 and piston 62 of the intensifier 50, a great mechanical advantage is thereby provided in addition to that of the hydraulic intensifier 50. Accordingly, the above-described downward force upon the workpiece 18 (FIG. 1) exerted by fluid under pressure within the first helical cavities 34 may easily be sufficient, in itself, to accomplish forming or coining operations by utilizing the connecting means 21 as hydraulic actuators to actuate the press without the use of additional, high-energy sources such as the explosive charge 15 (FIG. 1).

Further, while the invention has been shown and described primarily as applied to a press, it should be understood that the connecting means 21 may also be used as a fluid-driven actuator in other applications where such a large mechanical advantage is required. A particular advantage of the invention, when used as an actuator, is that the piston-face area may be made greater than the largest cross-sectional area of the piston chamber by increasing the height and length of the ribs 30, 31 relative to the chamber diameter. This factor is of great importance when the actuator is required to be as narrow as possible, for example, where a plurality of such actuators is required, and the actuators are required to be in parallel and closely spaced alignment. The invention is of much simpler construction than the "duplex" piston-chamber actuators commonly used in such applications, for it has only one moving part and may be easily assembled by threading the member 12 into the chamber, as described.

Referring now to FIG. 4, a modified, double-acting embodiment of the apparatus of FIG. 2 is similar, with the following additions, to that described above. A first annular seal 54 is mounted circumferentially of the first unthreaded portion 41 of the member 12 and spaced, in an upward direction, from the seal 36 (referred to hereinafter as the helical seal 36), yet spaced downwardly from the top of the unthreaded portion 41 of the member 12 when the member is in its first or downward position, the first unthreaded portion 41 and the chamber first unthreaded portion 43 being of sufficient length to allow such placement of the seal 54. The first annular seal 54 is thus sealingly and slideably associated with the member 12 regardless of the relative position of the member and is sealingly associated with the housing 23; it is, however, immovably seated, with respect to the housing 23, within a corresponding, annular seating groove formed in the first unthreaded portion 43 of the chamber 27. The first annular seal 54 acts to close the portion of the upper peripheral cavity 45 lying below it from communication, through the remaining portion of the peripheral cavity, with the environment ambient to the housing 23 and thus to close the second helical cavity 35 from communication, through the upper peripheral cavity 45, with the environment ambient to the housing 23. A second annular seal 57 is similarly mounted at the second unthreaded portion 42 of the member 12, immovably seated against the housing, and spaced downwardly from the helical seal 36 for similarly closing the second helical cavity 35 from communication, through the lower peripheral cavity 46, with the environment ambient to the housing 23 and member 12. Alternatively, the first and second annular seals 54, 57 may each be supplemented with a plastic shoe mounted between the respective seal and the member for decreasing the friction between the seal and the member, as is known in the art. Each shoe is preferably of a material having a low coefficient of friction, such as polyvinyl fluoride, and is of an annular configuration such that it seats within the respective seating groove and between the respective seal and the member 12. An additional or second passageway 55 similar to the passageway 47 (hereinafter termed the first passageway 47) communicates with the second helical cavity 35. A plurality of second supply conduits 60 similar to the above-described supply conduits 22 (hereinafter termed the first supply conduits 22) are provided, each communicating with one of the second passageways 55. The first and second conduits 22, 60 of all the connecting means 21 also communicate with a compound valve 61 of the type having an inlet 64, first and second supply outlets 65, 66, and a return outlet 67, the first and second conduits of each connecting means 21 communicating with the first and second supply outlets 65, 66, respectively. The valve inlet 64 has communication with the outlet 53 (FIG. 2) of the pressure intensifier 50 (FIG. 2), and the valve return outlet 67 is in communication with a drainage sump (not shown). The compound valve 61 is of the type operable for selectively and alternatively supplying a liquid under pressure through one of two outlets while draining fluid through the other outlet. Thus, the valve 61 is operable for selectively supplying liquid under pressure from the pressure intensifier 50 (FIG. 2) to the first helical cavity 34 of each connecting means 21 (through the first outlet 65, respective first supply conduit 22, and respective first passageway 47) while allowing any fluid within the second helical cavity 35 of each connecting means to drain (through the respective second passageway 55, the respective second conduit 60, the second supply outlet 66, and the return outlet 67) to the drainage sump (not shown); and alternately, for supplying liquid under pressure to the second helical cavities while allowing fluid to drain from the first helical cavities. Because the valve first supply outlet 65 is in common communication with all the first conduits 22 and first helical cavities 34, it conducts fluid under substantially the same pressure to each first helical cavity; similarly, the valve second supply outlet 66 is in communication with all of the second conduits 60 and second helical cavities 35 and conducts liquid under substantially the same pressure to all the second helical cavities 34. Upon fluid being connected to the second helical cavities 35 after the housings 23 have been moved upwardly to the third relative position, the housings will be moved downwardly to the first position by the resulting fluid pressure within the second helical cavities. Thus, the addition of the compound valve 61, plurality of second supply conduits 60, and, at each connecting means 21, a second passageway 55 and first and second annular seals 54, 57 enable the connecting means 21 to be used as double-acting actuators, with the housings 23 and upper platen 11 moveable in either an upward or downward direction. Such a double-acting embodiment has, for example, the additional advantage that the construction 13 (FIG. 1) and upper platen 11 may be conveniently raised or lowered, as required, by the operation of the single compound valve 61. The double-acting embodiment may also be used as a double-acting, fluid-driven actuator in applications other than with presses.

While only one embodiment of the invention, together with modifications thereof, has been described in detail herein and shown in the accompanying drawing, it will be evident that various further modifications are possible in the arrangement and construction of its components without departing from the scope of the invention.

What is claimed is:

1. In a press of the type provided with first and second, mutually spaced platens having forming means mounted therebetween and a plurality of two-ended, elongated, connecting members for connection between the first and second platens to prevent undesired relative displacement of the platens by forces developed during operation of the press, the construction comprising:

means connecting each of the elongated members, at one of its ends, to the first platen;

a male thread formed on the other end of each of the elongated members;

a plurality of mutually spaced chambers immovably located with respect to the second platen and each having a female thread threadingly engaging the male thread of a corresponding elongated member, each of the member threads and chamber threads having a groove wider than the respective thread rib engaged thereby and with a flat bottom sealingly associated with the rib engaged by the respective groove, whereby first and second, helical cavities are formed within the chamber groove and on opposite sides, respectively, of the associated member rib, the first helical cavity being closed and disposed such that each turn thereof lies between an adjacent, corresponding portion of a member rib and the first platen, the ribs of the members and chambers being slideably seated against the bottoms of the respective, associated grooves for permitting limited movement of the chambers along the axes of the associated members; and means for supplying a liquid under pressure to the first helical cavities, whereby liquid pressure in the first helical cavities exerts upon the chamber ribs a force urging the chambers and the second platen toward the first platen.

2. The apparatus claimed in claim 1, wherein a plurality of seals is provided for effecting said sealing association between the thread ribs of the members and chambers and the bottoms of the respective, associated grooves, each seal being in the form of an endless band and having first and second end sections and first and second side sections which connect and are continuous with the first and second end sections, each seal being mounted adjacent one of the first helical cavities and with its first side section extending along the respective member rib adjacent that first helical cavity and sealingly seating between the member rib and the associated groove bottom, the seal second side section extending along the respective chamber rib adjacent that first helical cavity and sealingly seating between the chamber rib and the associated groove bottom, and the seal first and second end sections being sealingly seated between the member and the material surrounding the chamber.

3. The apparatus recited in claim 1, the total, effective piston-face area of the chamber rib in each chamber being substantially equal to the corresponding piston-face area of the chamber rib of each other chamber, the means for supplying a liquid under pressure to the first helical cavities being operative for supplying said liquid under substantially the same pressure to each first helical cavity.

4. The apparatus recited in claim 1, the means for supplying a liquid under pressure to the first helical cavities comprising a plurality of supply passageways communicating with a common source of liquid under pressure, each supply passageway also communicating with one of the first helical cavities.

5. The apparatus of claim 1 in which the forming means is of a type including an electrically ignitable explosive charge, the apparatus further comprising:

a normally open switch connected between the charge and a source of electrical potential, and means responsive to liquid pressure in the first helical cavities for closing the switch when the pressure within the first helical cavities reaches a predetermined value.

6. The apparatus of claim 1, the second helical cavity having communication with the atmosphere.

7. In a press of the type provided with first and second, mutually spaced platens having forming means mounted therebetween and a plurality of two-ended elongated, connecting members for connection between the first and second platens to prevent undesired relative displacement of the platens by forces developed during operation of the press, the construction comprising:

means connecting each of the elongated members, at one of its ends, to the first platen;

a male thread formed on the other end of each of the elongated members;

a plurality of mutually spaced chambers immovably located with respect to the second platen and each having a female thread threadingly engaging the male thread of a coresponding elongated member, each of the member threads and chamber threads having a flat-bottomed groove wider than the respective thread rib engaged thereby, each rib being sealingly seated against the bottom of the respective associated groove, whereby first and second helical cavities are formed within the respective chamber groove and on opposite sides, respectively, of the associated member rib, the first helical cavity being disposed such that each turn thereof lies between an adjacent, corresponding portion of the associated member rib and the first platen, the ribs of the members and chambers being slideably seated against the bottoms of the associated grooves for permitting limited movement of ethe chambers along the axes of the associated members.

a plurality of seals provided for effecting said sealing between the thread ribs of the members and chambers and the bottoms of the respective, associated grooves, each seal being in the form of an endless band and having first and second end sections and first and second side sections which connect and are continuous with the first and second end sections, each seal being mounted adjacent one of the first helical cavities and with its first section extending along the member rib adjacent that first helical cavity and sealingly seating between the member rib and the associated groove bottom, with the seal second section extending along the respective chamber rib adjacent that first helical cavity and sealingly seating between the chamber rib and the associated groove bottom, and with the seal first and second end sections being sealingly seated between the member and the material surrounding the chamber, each chamber also provided with first and second means for closing its second helical cavity from the atmosphere, the first and second closing means being spaced in opposite directions, along the axis of the elongated member, from the first helical cavity; and means for selectively and alternately supplying a liquid under pressure to the first and second helical cavities, whereby liquid pressure in the first helical cavities exerts upon the chamber ribs a force urging the second platen toward the first platen and, alternately, liquid pressure in the second helical cavities exerts upon the chamber ribs a force urging the second platen away from the first platen.

8. The apparatus recited in claim 7, the total, effective piston-face area of the chamber rib in each chamber being substantially equal to the piston-face area of the chamber rib of each other chamber, the means for selectively supplying a liquid under pressure to the first helical cavities and to the second helical cavities being operative for selectively supplying said liquid under substantially the same pressure to each first helical cavity and to each second helical cavity.

9. The apparatus of claim 7, the means for supplying a liquid to the first helical cavities comprising a plurality of first supply passageways each communicating between one of the first helical cavities and a source of liquid under pressure common to all the first supply passageways, and the means for supplying a liquid to the second helical cavities comprising a plurality of second supply passageways each communicating between one of the second helical cavities and a source of liquid-under pressure common to all the second supply passageways.

10. The apparatus of claim 7 in which the forming means is of a type including an electrically ignitable explosive charge, the apparatus further comprising:
  a normally open switch connected between the charge and a source of electrical potential; and
  means responsive to liquid pressure in the first helical cavities for closing the switch when the pressure within the first helical cavities reaches a predetermined value.

11. An apparatus comprising:
a member having an axis, first and second ends, and a male thread formed on the first end and coaxially of the member;
a housing having a chamber provided with a female thread threadingly engaging the male thread of the member, the member thread and chamber thread each having a groove wider than the respective thread rib engaged thereby and with a flat bottom sealingly associated within the rib engaged by the respective groove, whereby first and second, helical cavities are formed within the chamber groove and on opposite sides, respectively, of the associated member rib, the first helical cavity being closed and disposed such that each turn thereof lies between an adjacent, corresponding portion of the member rib and the member second end, the ribs of the member and chamber being slideably seated against the bottoms of the respective, associated grooves for permitting limited axial movement of the member relative to the chamber; and means for supplying a liquid under pressure to the first helical cavity, whereby liquid pressure in the first helical cavity exerts upon the member rib a force urging it and the member in the direction, along the member thread axis, from the member second end to the member first end.

12. The apparatus claimed in claim 1, wherein a seal is provided for effecting said sealing association between the thread ribs of the member and chamber and the bottoms of the respective, associated grooves, the seal being in the form of an endless band and having first and second end sections and first and second side sections which connect and are continuous with the first and second end sections, the seal being mounted adjacent the first helical cavity and with its first side section extending along the member rib and sealingly seating between the member rib and the associated groove bottom, the seal second side section extending along the chamber rib and sealingly seating between the chamber rib and the associated groove bottom, and the seal first and second end sections being sealingly seated between the member and the material surrounding the chamber.

13. An apparatus comprising:
  a member having an axis, first and second ends, and a male thread formed on the first end and coaxially of the member;
  a housing having a chamber provided with a female thread threadingly engaging the male thread of the member, the member thread and chamber thread each having a groove wider than the respective thread rib engaged thereby and having a flat bottom, each rib being sealingly seated against the bottom of the associated groove, whereby first and second helical cavities are formed within the chamber groove and on opposite sides, respectively, of the associated member rib, the first helical cavity being disposed such that each turn thereof lies between an adjacent, corresponding portion of the member rib and the member second end, the ribs of the member and chamber being slideably seated against the bottoms of the associated grooves for permitting limited, axial movement of the member relative to the chamber;
  a seal for effecting said sealing between the thread ribs of the member and chamber and the bottoms of the respective, associated grooves, the seal being in the form of an endless band and having first and second end sections and first and second side sections which connect and are continuous with the first and second end sections, the seal being mounted adjacent the first helical cavity and with its first section extending along the member rib and sealingly seating between the member rib and the associated groove bottom, with the seal second section extending along the chamber rib and sealingly seating between the chamber rib and the associated groove bottom, and with the seal first and second end sections being sealingly seated between the member and the material surrounding the chamber, the chamber also being provided with first and second means for closing its second helical cavity from the atmosphere, the first and second closing means being spaced in opposite directions, along the member axis, from the first helical cavity; and means for selectively and alternately supplying a liquid under pressure to the first and second helical cavities, whereby liquid pressure in the first helical cavity exerts upon the member rib a force urging it and the member in the direction, along the member thread axis, from the member second end to the member first end and, alternately, liquid pressure in the second helical cavity exerts upon the member rib a force urging it and the member in the direction, along the member thread axis, from the member first end to the member second end.

References Cited

UNITED STATES PATENTS

| | | | |
|---|---|---|---|
| 1,580,894 | 4/1926 | Hummel | 100—214 |
| 3,130,628 | 4/1964 | Blinn | 85—1 |
| 3,158,048 | 11/1964 | Bollar | 72—453 |
| 3,181,328 | 5/1965 | Zeitlin | 72—453 |
| 3,316,749 | 5/1967 | Beard | 72—450 |
| 3,353,397 | 11/1967 | Hoffmann | 72—455 |

CHARLES W. LANHAM, Primary Examiner

G. P. CROSBY, Assistant Examiner

U.S. Cl. X.R.

100—214

PO-1050
(5/69)

UNITED STATES PATENT OFFICE
CERTIFICATE OF CORRECTION

Patent No. __3,531,973__          Dated __October 6, 1970__

Inventor(s) __Thomas F. Bickley__

It is certified that error appears in the above-identified patent and that said Letters Patent are hereby corrected as shown below:

Column 1, line 52, the word "correspondingly" should read -- corresponding --; line 56, the word -- of -- should appear after "be"; line 66, the word "short" should read -- shortest --. Column 3, line 44, the word -- a -- should appear before "relatively". Column 4, line 62, the word "with" should read -- within --. Column 5, line 2, ""acme'" should read -- "acme" --; line 23, the word "from" should read -- form --; line 74, the word "perpheral" should read -- peripheral --; line 75, the word "and" should read -- an --. Column 6, line 12, the word "eripheral" should read -- peripheral --; line 26, the word -- helical -- should appear after "second"; line 27, the word "environmental" should read -- environment --; line 28, the word "it" should read -- is --. Column 8, line 45, the word "perpheral" should read -- peripheral --. Column 9, line 24, the word "passageway" should read -- passageways --; line 35, the word "descrbed" should read -- described --. Column 11, line 29, the word "connected" should read -- conducted --. Column 13, line 9, the word "ethe" should read -- the --; line 10, a semicolon should replace the period after "members"; line 59, "liquid-under" should read -- liquid under --. Column 14, line 4, the word "within" should read -- with --.

Signed and sealed this 16th day of November 1971.

(SEAL)
Attest:

EDWARD M. FLETCHER, JR.
Attesting Officer

ROBERT GOTTSCHALK
Acting Commissioner of Patents